United States Patent
Miyauchi et al.

(10) Patent No.: US 8,038,498 B2
(45) Date of Patent: Oct. 18, 2011

(54) METHOD OF MANUFACTURING THREE DIMENSIONAL IMAGE DISPLAY DEVICE

(75) Inventors: Takashi Miyauchi, Kawasaki (JP); Kentaro Miyazaki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 273 days.

(21) Appl. No.: 12/498,743

(22) Filed: Jul. 7, 2009

(65) Prior Publication Data

US 2010/0009589 A1     Jan. 14, 2010

(30) Foreign Application Priority Data

Jul. 10, 2008   (JP) ............................... P2008-180040

(51) Int. Cl.
*H01J 9/00*   (2006.01)
*B32B 37/10*  (2006.01)
*B29C 65/54*  (2006.01)

(52) U.S. Cl. ............ 445/25; 156/99; 156/107; 156/285; 156/295

(58) Field of Classification Search ................ 45/24, 25; 349/187–192; 156/105–107, 285–286, 288, 156/295

See application file for complete search history.

(56) References Cited

U.S. PATENT DOCUMENTS

| | | | |
|---|---|---|---|
| 5,207,607 A * | 5/1993 | Nagano et al. | 445/25 |
| 6,817,917 B1 * | 11/2004 | Kado et al. | 445/25 |
| 6,827,623 B2 * | 12/2004 | Nakatake et al. | 445/25 |
| 2003/0073372 A1 * | 4/2003 | Nakatake et al. | 445/25 |

FOREIGN PATENT DOCUMENTS

| | | |
|---|---|---|
| JP | 3708112 | 8/2005 |
| JP | 4373491 B1 * | 11/2009 |

* cited by examiner

*Primary Examiner* — Mariceli Santiago
(74) *Attorney, Agent, or Firm* — Oblon, Spivak, McClelland, Maier & Neustadt, L.L.P.

(57) ABSTRACT

A method of manufacturing a three dimensional image display device includes: applying an adhesive member to any one of a lens plate and a display panel so as to form a continuous frame having an application height higher than a separation distance between the lens plate and the display panel in a bonding complete state; measuring the application height of the adhesive member; figuring out a volume of an enclosed space, which is formed by the display panel, the adhesive member and the lens plate, by using a lowest application height of the adhesive member, and figuring out a bonding pressure leading to obtaining of a necessary internal pressure in the enclosed space, by using the figured-out volume of the enclosed space; and bonding the lens plate and the display panel together with the adhesive member in a reduced pressure atmosphere with the figured-out bonding pressure.

2 Claims, 7 Drawing Sheets

METHOD OF MANUFACTURING THREE DIMENSIONAL IMAGE DISPLAY DEVICE

CROSS REFERENCE OF THE RELATED APPLICATION

This application is based on and claims the benefit of priority from Japanese Patent Application No. 2008-180040, filed on Jul. 10, 2008; the entire contents of which are incorporated herein by reference.

BACKGROUND OF THE INVENTION

1. Field of the Invention

The present invention relates to a method of manufacturing a three dimensional image display device.

2. Description of the Related Art

Flat panel display devices are generally used as display panels for three dimensional image display devices. Such flat panel display devices include: a liquid crystal display panel (LCD) which controls the intensity of light by utilizing the orientation of liquid crystals, a plasma display panel (PDP) in which ultraviolet rays of plasma discharges cause phosphors to emit light, a field emission display panel (FED) in which electron beams of a field emission electron emitter cause phosphors to emit light, and an electron emission display panel in which electron beams of a surface-conduction electron emitter cause phosphors to emit light.

Various systems such as a multi-view system and an integral imaging system are used as three dimensional image display systems for three dimensional image display devices. As one type of three dimensional image display devices which display three dimensional images using such systems, there has been developed a three dimensional image display device including a lenticular lens. Three dimensional images provided by the display device including a lenticular lens are viewable without use of glasses or the like for three dimensional image viewing.

In order to mount a lenticular lens on a display panel, an adhesive applied on the display panel in a rectangular frame shape is used to bond a lens plate including the lenticular lens and the display panel together. In this regard, a technique of mounting a lenticular lens on a liquid crystal display panel has been proposed for the purpose of improving the efficiency for light utilization (see JP-B No. 3708112, for example).

In a process of mounting a lenticular lens on a display panel, it is so difficult to bring the lenticular lens into complete contact with the display panel that a gap may be formed therebetween. Even when a display panel and a lenticular lens are brought into complete contact with each other, deformation due to their own weights, partial pressurization from outside, ambient temperature rise and the like may cause a gap after the manufacturing. If such a gap is larger than an allowable range (for example, a range of a desired value plus or minus several tens of μm), an error in the viewing angle falls outside an allowable range. Accordingly, the display quality of a three dimensional image is degraded.

One possible countermeasure for solving the above problem is a method in which, by using an adhesive member in a continuous frame shape (close-loop shape), a display panel and a lens plate are bonded together in a reduced pressure atmosphere with the display panel and a lenticular lens facing each other. This method, however, causes a phenomenon in which an internal pressure in an enclosed space in the display device becomes higher than a pressure in the reduced pressure atmosphere in which the bonding is performed. This phenomenon is explained in detail below.

In the process of manufacturing the display device, the height of an adhesive applied on a periphery portion of a display panel is made higher than the height of the final adhesive (adhesive layer) after the manufacturing. Such application of the adhesive is intended to ensure bonding in the entire adhesive-applied area after the bonding is completed. With such application of the adhesive, however, the applied adhesive is squashed to some extent by the display panel and the lens plate before the display panel and the lens plate are bonded finally. In this bonding process, when the display panel and the lens plate come close to each other with the adhesive member interposed therebetween, the display panel and the lenticular lens firstly form an enclosed space while being spaced apart from each other. Thereafter, as the display panel and the lens plate come closer to each other, the volume of the enclosed space proportionally decreases. As a result, the internal pressure in the enclosed space becomes higher than the ambient pressure (bonding pressure) of the surroundings.

Here, when Vb denotes the volume of the enclosed space formed in a distant state where the display panel and the lenticular lens are spaced apart from each other; Va denotes the volume of the enclosed space in a bonding complete state where the bonding is completed; and Pb denotes the ambient pressure of the surroundings (bonding pressure) where the bonding is performed, a final internal pressure Pa in the enclosed space is expressed as Pa=Pb×Vb/Va. For example, when Pb=0.5 atm and Vb/Va=1.5, Pa=0.75 atm.

In the case where the adhesive is applied to the display panel or the lens plate in a close-loop shape in advance to bond the display panel and the lens plate together, the volume Vb of the enclosed space in the distant state is determined by the lens shape, the frame size and the height of the adhesive applied in the close-loop shape, and the like. Even under the same conditions (pressure, nozzle diameter, application speed, and the like) of an applicator, the height of the applied adhesive (simply called "application height" below), in particular, varies depending on a viscosity change of the adhesive due to a temperature, a time length from the completion of application to bonding, or the like. Such a variation in the application height largely affects the final internal pressure Pa.

As described above, the internal pressure Pa of the enclosed space is higher than the ambient pressure (bonding pressure) Pb of the atmosphere where the bonding is performed. As a result, the internal pressure Pa only has a small pressure difference from the atmospheric pressure. This condition facilitates the generation of a gap between the display panel and the lens plate because of deformation due to their own weights, partial pressurization from outside, ambient temperature rise and the like, and thereby makes it difficult to maintain accuracy of a gap between the display panel and the lens plate, i.e., gap accuracy between the pixels and the lens.

SUMMARY OF THE INVENTION

The present invention aims to provide a method of manufacturing a three dimensional image display device capable of maintaining gap accuracy between pixels and a lens.

In a first aspect according to an embodiment of the present invention, a method of manufacturing a three dimensional image display device includes: applying an adhesive member to any one of a lens plate including a lenticular lens, and a display panel configured to display an image, the adhesive member applied to form a continuous frame having an application height higher than a separation distance between the lens plate and the display panel in a bonding complete state;

measuring the application height of the adhesive member thus applied; figuring out a volume of an enclosed space, which is formed by the display panel, the adhesive member and the lens plate, by using a lowest application height of the adhesive member thus measured, and figuring out a bonding pressure leading to obtaining of a necessary internal pressure in the enclosed space by using the volume of the enclosed space thus figured out; and bonding the lens plate and the display panel together by use of the adhesive member, with the display panel and the lenticular lens facing each other, in a reduced pressure atmosphere with the figured-out bonding pressure.

In a second aspect according to an embodiment of the present invention, a method of manufacturing a three dimensional image display device includes: applying an adhesive member to any one of a lens plate including a lenticular lens, and a display panel configured to display an image, the adhesive member applied to form a continuous frame having an application height higher than a separation distance between the lens plate and the display panel in a bonding complete state, the continuous frame including a recessed portion having an application height lower than the separation distance; and bonding the lens plate and the display panel together by use of the adhesive member in a reduced pressure atmosphere with the display panel and the lenticular lens facing each other.

In a third aspect according to an embodiment of the present invention, a method of manufacturing a three dimensional image display device includes: applying an adhesive member to any one of a lens plate including a lenticular lens, and a display panel configured to display an image, the adhesive member applied to form a discontinuous frame having an application height higher than a separation distance between the lens plate and the display panel in a bonding complete state; and bonding the lens plate and the display panel together by use of the adhesive member in a reduced pressure atmosphere with the display panel and the lenticular lens facing each other.

DESCRIPTION OF THE PREFERRED EMBODIMENTS

First Embodiment

A first embodiment of the present invention will be described with reference to FIGS. 1 to 9.

(Three Dimensional Image Display Device)

Figure 1:
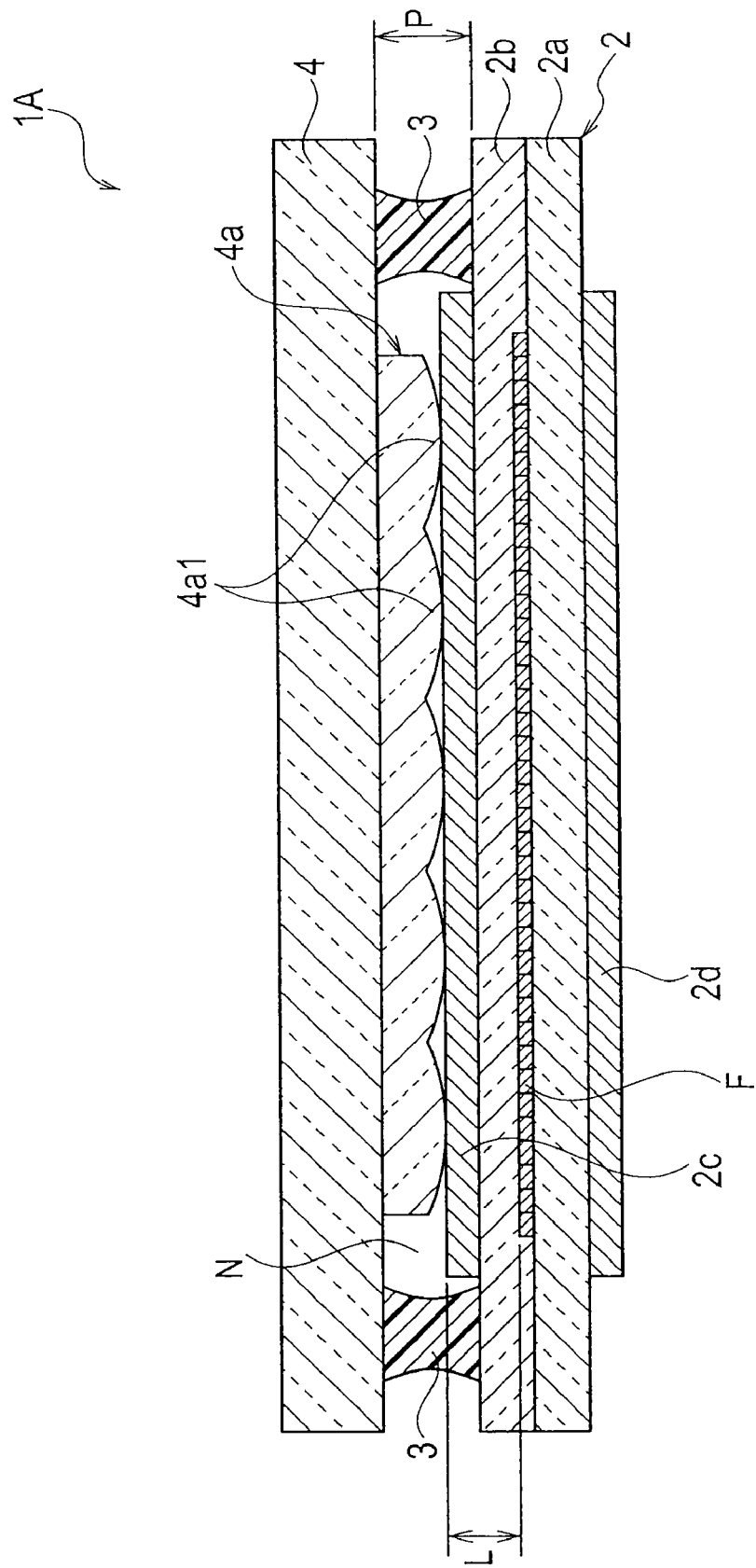
FIG. 1 is a cross section view of a schematic configuration of a display device according to a first embodiment of the present invention.

As shown in FIG. 1, a three dimensional image display device (hereinafter, simply called a display device) 1A according to the first embodiment of the present invention includes a display panel 2, and a lens plate 4 that is provided above the display panel 2 with an adhesive member 3 interposed therebetween and has a lenticular lens 4a on its display panel 2 side. An enclosed space N is an internal space formed by the display panel 2, the adhesive member 3 and the lens plate 4, and is hermetically sealed. The enclosed space N is in a hermetically sealed state having an internal pressure lower than the atmospheric pressure.

The display panel 2 includes a first substrate 2a that is an array substrate or the like and serves as a back surface substrate; and a second substrate 2b which serves as a front surface substrate. Within a plane of this display panel 2, multiple pixels are arranged in a predetermined pattern such as a matrix pattern (grid pattern), for example. A liquid crystal display panel, for example, may be used as such display panel 2. A liquid crystal layer (not illustrated) is provided between the first substrate 2a and the second substrate 2b. In addition, two polarizing plates 2c, 2d are provided on outer surfaces of the display panel 2. The two polarizing plates 2c and 2d are disposed on the display panel 2 to be opposed to each other.

The first substrate 2a is a rectangular glass substrate, for example. An inner surface (a surface facing the second substrate 2b: an upper surface in FIG. 1) of the first substrate 2a is provided with multiple pixel electrodes, electrical wiring for supplying power to the pixel electrodes, and the like (any of them not illustrated). One of the pixel electrodes is provided to each pixel and is formed in a dot form (punctiform) The electrical wiring is provided in a matrix form (grid form) The second substrate 2b is a rectangular glass substrate, for example. An inner surface (a surface facing the first substrate 2a: a lower surface in FIG. 1) of the second substrate 2b is provided with a color filter F and a counter electrode (not illustrated) serving as a common electrode. The color filter F includes multiple color layers (red, green and blue) provided in a dot form or stripe form; and a shield layer such as a black matrix layer.

The adhesive member 3 is a member provided between the display panel 2 and lens plate 4 to surround the lenticular lens 4a, and used to bond the display panel 2 and the lens plate 4 together. This adhesive member 3 is formed, for example, in a rectangular frame shape between the display panel 2 and the lens plate 4. The adhesive member 3 functions as a side wall forming the enclosed space N by coupling the display panel 2 and the lens plate 4 to each other, and maintains the airtightness of the enclosed space N. A photocurable resin, for example, is usable as the adhesive member. Here, the adhesive member 3 is formed to have a predetermined design value such as 0.5 mm in height (thickness of the adhesive layer) after the display panel 2 and the lens plate 4 are bonded together, that is, in final adhesive thickness P (see FIG. 1). Here, the final adhesive thickness P is a separation distance between the display panel 2 and the lens plate 4 after their bonding is completed.

The lens plate 4 is a lens member, such as a lens substrate or a lens sheet, including the lenticular lens 4a configured to generate a three dimensional image. This lens plate 4 is of a rectangular substrate, for example. The lenticular lens 4a is formed of cylindrical lenses (cylindrical surface lenses) 4a1 each having a shape of one of two pieces of a cylinder divided in its axial direction. The cylindrical lenses 4a1 are arranged adjacent to each other in a direction (its short-side direction) orthogonal to the axial direction (its longitudinal direction, i.e., its ridge direction). The cylindrical lens 4a1 is a cylinder-shaped lens having a curvature only in one direction, and has a single curved surface. The lenticular lens 4a is fixed to an inner surface of the lens plate 4 and thus is provided as a part of the lens plate 4. Incidentally, the lenticular lens 4a and the lens plate 4 may be formed separately first and then integrated; or may be formed integrally by using the same material from the beginning.

The display device 1A described above displays an image by applying voltages according to image signals (image data) to the pixel electrodes for the respective pixels arranged in the matrix form, and thereby by causing variations in optical characteristics among the pixels (in the liquid crystal layer). In particular, the display device 1A forms a three dimensional image by displaying multiple parallax images (two dimensional images) in an integral imaging scheme. The parallax images show slightly different images of an object that are obtained when the object is viewed from different angles. The three dimensional image thus formed is natural, easy to view, and less likely to make a viewer tired. Moreover, a viewable range of such three dimensional image is continuous.

If the lenticular lens 4a and the display panel 2 are not in complete contact with each other, a gap is formed therebetween. More specifically, here, assuming that a vertical distance L denotes a separation distance between a convex portion (lens edge) of the lenticular lens 4a and the color filter F (a separation distance between the pixels and the lens), the vertical distance L needs to be within an allowable range (for example, a range of a desired value plus or minus several tens of μm).

For instance, if a gap that is the separation distance between the convex portion of the lenticular lens 4a and the display panel 2 (the polarizing plate 2c) is large, the vertical distance L falls outside the allowable range, and an error in the viewing angle also falls outside an allowable range (for example, a range of a desired value plus or minus several degrees). Thus, the display quality of a three dimensional image is degraded. Moreover, even if the convex portion of the lenticular lens 4a and the display panel 2 (the polarizing plate 2c) are in complete contact with each other after manufacturing, a gap exceeding the allowable range may be formed therebetween because of deformation due to their own weights, partial pressurization from outside, ambient temperature rise and the like.

In the foregoing display device 1A, the enclosed space N formed by the display panel 2, the adhesive member 3 and the lens plate 4 is hermetically sealed with an inner pressure lower than the atmospheric pressure. Thus, since the enclosed space N is hermetically sealed with the inner pressure lower than the atmospheric pressure, the convex portions of the lenticular lens 4a and the display panel 2 (the polarizing plate 2c) are in complete contact with each other without having any gap, and thus the vertical distance L falls within the allowable range. This, in turn, allows the error in the viewing angle to fall within the allowable range, and thereby prevents a degradation of the display quality of the three dimensional image. Additionally, since such complete contact is maintained in the enclosed space N, a change of the gap because of deformation due to the own weights, partial pressurization from outside, ambient temperature rise and the like is prevented even after the manufacturing. As a result, the vertical distance L can also be maintained within the allowable range.

(Method of Manufacturing Three Dimensional Image Display Device)

Hereinafter, a method of manufacturing the aforementioned display device 1A will be described.

Figure 2:
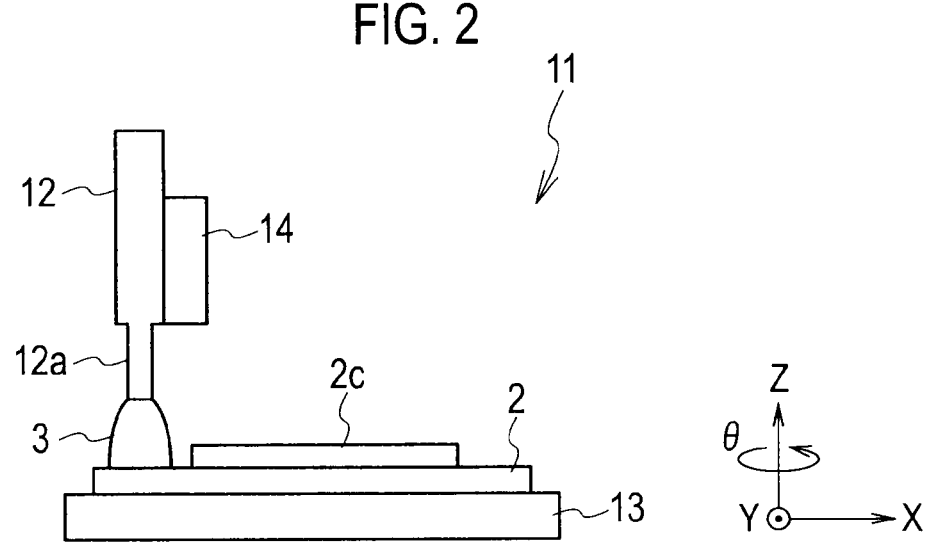
FIG. 2 is an explanatory diagram for explaining a step performed by an adhesive applicator according to the first embodiment of the present invention.
Figure 3:
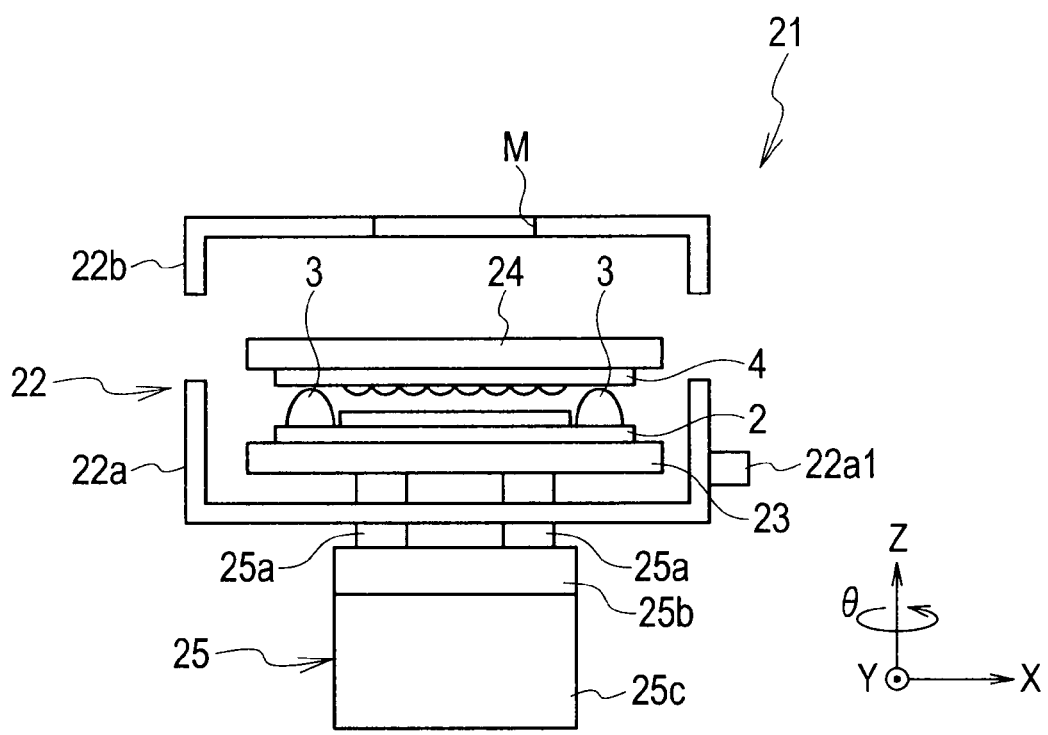
FIG. 3 is a first explanatory diagram for explaining a step performed by a bonding machine according to the first embodiment of the present invention
Figure 4:
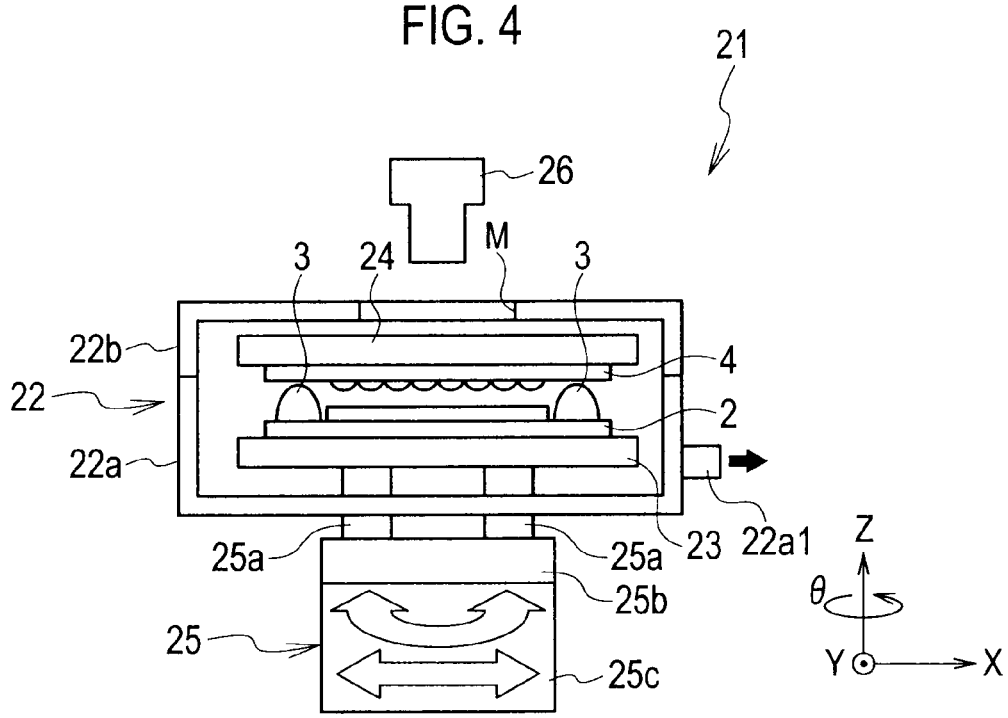
FIG. 4 is a second explanatory diagram.
Figure 5:
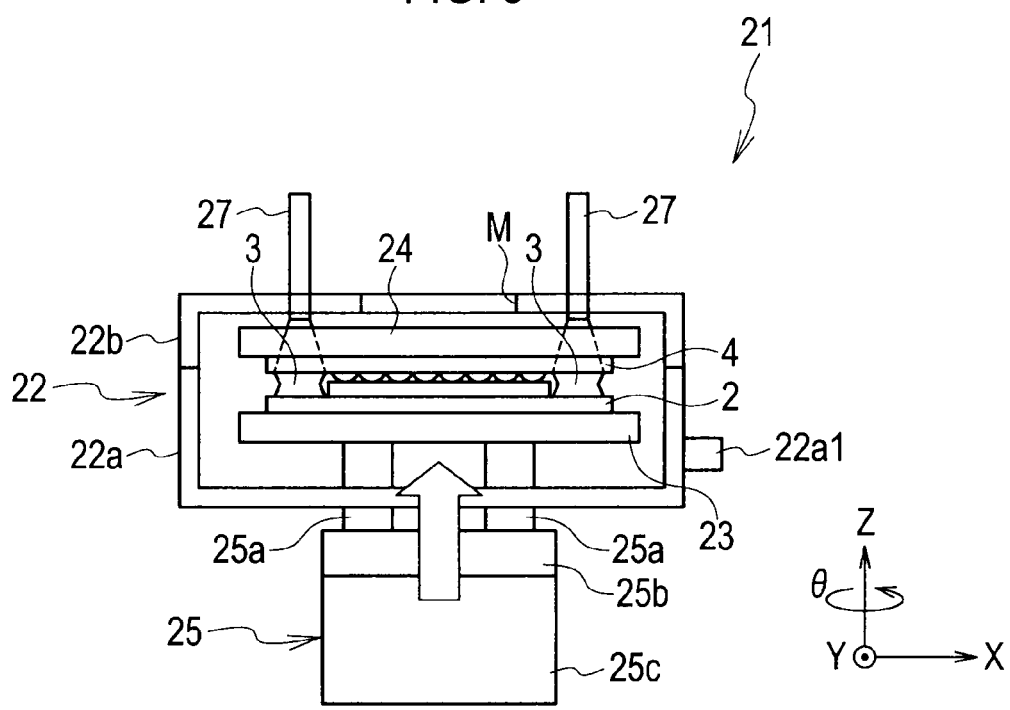
FIG. 5 is a third explanatory diagram.
Figure 6:
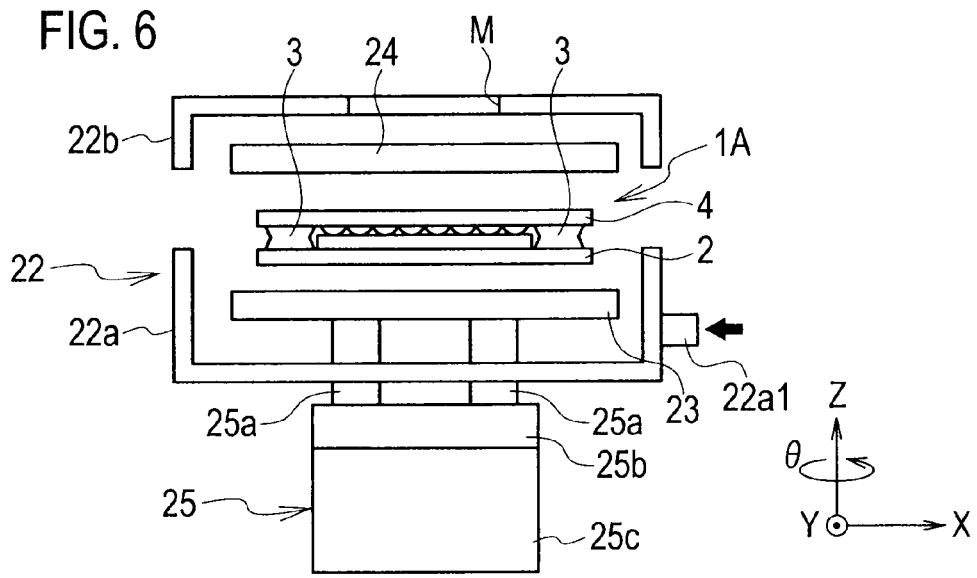
FIG. 6 is a fourth explanatory diagram.

A manufacturing process includes: an application step of applying the adhesive member 3 as an adhesive to the display panel 2 by use of an adhesive applicator 11 as shown in FIG. 2; a placement step of placing the lens plate 4 and the display panel 2 having the adhesive member 3 applied thereto, in a decompression chamber 22 of a bonding machine 21 as shown in FIG. 3; a decompression step of reducing the pressure in the decompression chamber 22 as shown in FIG. 4; an alignment step of aligning the display panel 2 and the lens plate 4 with each other; a bonding step of bonding the display panel 2 and the lens plate 4 together as shown in FIG. 5; a precuring step of partially curing the adhesive member 3 formed between the display panel 2 and the lens plate 4 in a bonding complete state; and a taking-out step of taking out the display device 1A after opening the decompression chamber 22 to the air as shown in FIG. 6.

In the application step, as shown in FIG. 2, a stage 13 on which the display panel 2 is placed is moved in XY directions relative to an application head 12 configured to discharge the adhesive member 3 from a nozzle 12a, and thus the adhesive member 3 is applied to the display panel 2 on the stage 13. During the application, a gap for application between the nozzle 12a of the application head 12 and the display panel 2 on the stage 13 is maintained at a constant distance.

The application head 12 contains the adhesive member 3 in its inside, and discharges the adhesive member 3 from the nozzle 12a communicating with the inside. This application head 12 is equipped with a laser displacement meter 14 that is a non-contact type displacement meter using a laser. This laser displacement meter 14 measures the gap for application between the nozzle 12a of the application head 12 and the display panel 2 on the stage 13 during the application by the application head 12. This gap for application is used for feedback control performed by a controller of the adhesive applicator 11. In addition, in order to obtain the application height of the adhesive member 3, the laser displacement meter 14 measures the separation distance to the upper surface of the adhesive member 3 on the display panel 2, and the separation distance to the upper surface of the display panel 2. The controller of the adhesive applicator 11 computes the application height of the adhesive member 3 by using the separation distances thus measured.

The adhesive member 3 is applied onto the display panel 2 so as to form a continuous frame. The application height of the adhesive member 3 is set higher than the final adhesive thickness P (see FIGS. 1 and 7) of the display device 1A (for instance, the final adhesive thickness P is 0.5 mm whereas the application height is 1 mm and the application width is 4 mm). Such application of the adhesive ensures the bonding in the entire adhesive-applied area when the bonding of the display panel 2 and the lens plate 4 is completed. In this case, the adhesive member 3 on the display panel 2 is squashed to some extent before the final bonding of the display panel 2 and the lens plate 4 is completed. When the display panel 2 and the lens plate 4 come close to each other, the enclosed space (internal space) N is firstly formed with the display panel 2 and the lenticular lens 4a of the lens plate 4 spaced apart from each other (see the left side of FIG. 7). Thereafter, as the display panel 2 and the lens plate 4 come closer to each other, the volume of the enclosed space N proportionally decreases (see the right side of FIG. 7).

Figure 7:
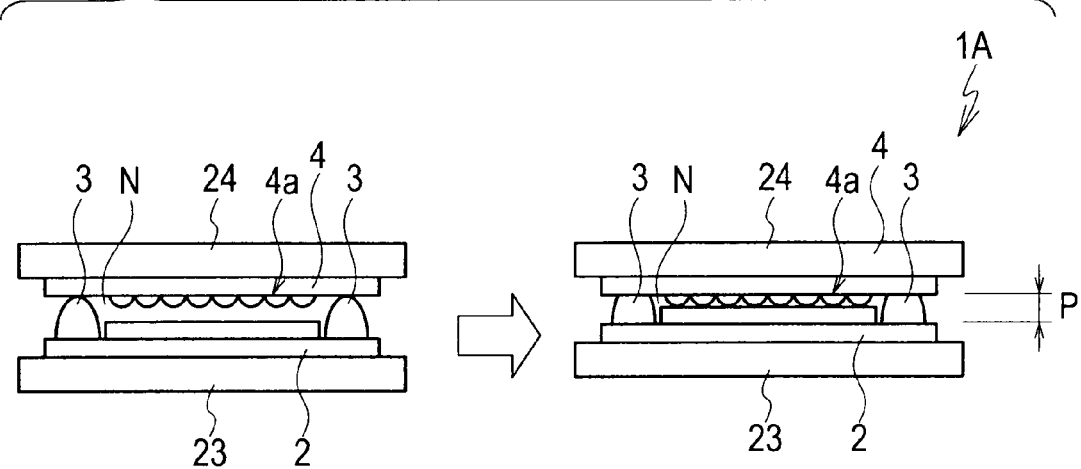
FIG. 7 is an explanatory diagram for explaining a change in the volume of an enclosed space in a bonding step.

Here, assume that Vb denotes the volume of the enclosed space N in a distant state where the display panel 2 and the lenticular lens 4a are spaced apart from each other (see the left side of FIG. 7); Va denotes the volume of the enclosed space N in a bonding complete state where the final bonding is completed (see the right side of FIG. 7); and Pb denotes the ambient pressure of the atmosphere where the bonding is performed (bonding pressure). Under this assumption, a final internal pressure Pa in the enclosed space N is expressed as Pa=Pb×Vb/Va. Accordingly, what is needed to figure out the bonding pressure Pb (=Pa=Va/Vb) that leads to obtaining of the necessary internal pressure Pa is only to calculate the volume Vb of the enclosed space N in the distant state because the volume Va of the enclosed space N in the bonding complete state is determined based on the design values.

There are two methods for calculating the volume Vb of the enclosed space N in the distant state. To begin with, a first method of the two includes: applying the adhesive member 3 in a continuous frame shape with the application height higher than the final adhesive thickness P; actually measuring the application height of the entire adhesive-applied area of the adhesive member 3 immediately before the bonding step; and calculating the volume Vb of the enclosed space N in the distant state by using the height of a portion having the lowest application height in the entire adhesive-applied area. Then, the necessary bonding pressure Pb is calculated and set. Here, the actual measurement of the application height is made by use of the laser displacement meter 14.

Next, the second method includes: applying a smaller amount of the adhesive member 3 to a particular part so that the application height of the particular part of the adhesive member 3 can be made lower than that of the other part; actually measuring the height (the height of the portion having the lowest application height) of the particular portion (a recessed portion) only immediately before the bonding step; and then calculating the volume Vb of the enclosed space N in the distant state. Then, the necessary bonding pressure Pb is calculated and set. Generally speaking, the application height of the adhesive member 3 tends to be the highest immediately after the application, then gradually decreases over time and stops decreasing at a certain height. Also taking this tendency into consideration, applying a smaller adhesive amount to an application start position is considered as effective to implement a stable manufacturing process.

Figure 8:
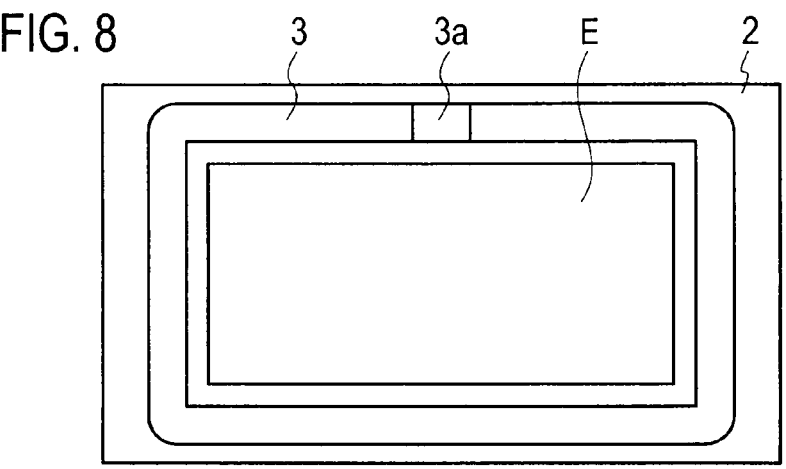
FIG. 8 is a plan view showing a display panel after the application of an adhesive member according to the first embodiment of the present invention.
Figure 9:
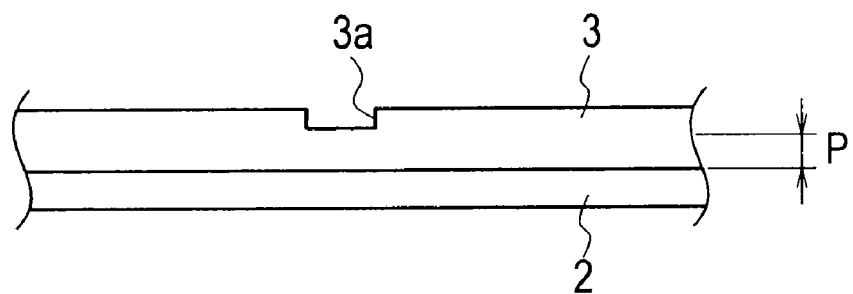
FIG. 9 is a side view showing, in a zoom-in mode, a part of the display panel after the application of the adhesive member shown in FIG. 8.

For example, in the second method, the adhesive member 3 is applied in a continuous frame shape so as to surround a display region E of the display panel 2. Here, the display region E is a region in which pixels are formed to contribute to display. In addition, the adhesive member 3 is applied to be recessed in one portion as shown in FIGS. 8 and 9. Thus, one recessed portion 3a is formed in the adhesive member 3 in the continuous frame shape. This recessed portion 3a is formed by reducing the adhesive amount applied, for example, to an application start position. The application height of the entire adhesive member 3, also including the recessed portion 3a, is higher than the final adhesive thickness P.

The height of the recessed portion 3a is measured by the laser displacement meter 14, and the controller of the adhesive applicator 11 calculates the volume Vb of the enclosed space N in the distant state. Note that, since the area (the frame size) on the display panel 2 surrounded by the adhesive member 3 is constant according to the design values, the volume Vb of the enclosed space N in the distant state can be calculated only by the measurement of the application height of the recessed portion 3a. Then, the volume Vb thus calculated, also the necessary internal pressure Pa, and the volume Va of the enclosed space N in the bonding complete state are assigned to Pb=Pa×Va/Vb, and thereby the bonding pressure Pb leading to the obtaining of the necessary internal pressure Pa is figured out. The pressure Pb thus figured out is transmitted to and stored in the bonding machine 21.

In the placement step, the display panel 2 after the application of the adhesive member 3 is placed on a stage 23 provided inside a first chamber 22a of the decompression chamber 22, as shown in FIG. 3. Then, the lens plate 4 is attached to a supporting unit 24 so that the lenticular lens 4a can face the display panel 2 on the stage 23. The supporting unit 24 is configured to support the lens plate 4 at a predetermined height from the stage 23.

The decompression chamber 22 is formed to be separable into the first chamber 22a and a second chamber 22b. The decompression chamber 22 can be in a close state in which the first chamber 22a and the second chamber 22b are unified, and can be in an open state in which the first chamber 22a and the second chamber 22b are separated from each other. The first chamber 22a is a lower chamber that accommodates the stage 23 from below, while the second chamber 22b is an upper chamber (a cover chamber) that accommodates the stage 23 from above. The second chamber 22b is formed to be movable in a z axis direction or other directions by a chamber moving mechanism.

The stage 23 is configured to hold the display panel 2 by means of a holing mechanism using suction adsorption, electrostatic adsorption or the like. The display panel 2 is placed on a holder surface of the stage 23 and thus is held in the placed position by the holding mechanism. An illumination unit (not illustrated) such as a backlight configured to emit light is provided inside the stage 23. This illumination unit is turned on and used to capture images of alignment marks when the display panel 2 and the lens plate 4 are bonded together. The supporting unit 24 includes a holding frame that removably holds the lens plate 4 by means of the holing mechanism using suction adsorption or the like; and multiple supporting members that support the holding frame at a predetermined height from the stage 23.

In the decompression step, as shown in FIG. 4, the second chamber 22b is moved down by the chamber moving mechanism (not illustrated) and the decompression chamber 22 enters the closed state. Thereafter, by use of a decompression unit (not illustrated) configured to reduce the pressure inside the decompression chamber 22, the air inside the decompression chamber 22 is discharged from an opening portion 22a1 of the first chamber 22a. In this way, the inside of the decompression chamber 22 is evacuated to a predetermined vacuum pressure by the decompression unit and thus has a lower pressure than the atmospheric pressure. Note that this predetermined vacuum pressure is the bonding pressure Pb obtained and set by the adhesive applicator 11.

In the alignment step, as shown in FIG. 4, the positioning of the display panel 2 on the stage 23 relative to the lens plate 4 supported by the supporting unit 24 is performed by using a stage moving mechanism 25 configured to move the stage 23 in XYZθ directions; and using an image capture unit 26 configured to perform an image capture operation. More specifically, images for alignment are captured by the image capture unit 26, the display panel 2 on the stage 23 is moved by the stage moving mechanism 25 according to the images thus captured, and thereby the display panel 2 is aligned. Here, the alignment of the display panel 2 and the lens plate 4 is performed so that a misalignment between the display panel 2 and the lenticular lens 4a in relative position in a plane direction can fall within an allowable range (for example, a range of a desired value plus or minus several μm).

The stage moving mechanism 25 includes: multiple struts 25a that extend to the inside of the decompression chamber 22 to support the stage 23; a table 25b to which the struts 25a are fixed; and a table moving mechanism 25c that supports and moves the table 25b in the XYZθ directions. The struts 25a support the stage 23 while being respectively inserted in through holes provided in the bottom surface of the first chamber 22a. Here, the airtightness of the decompression chamber 22 is maintained by an expansive pipe such as a bellows. One end of each strut 25a is fixed to the lower surface of the stage 23, and the other end of the strut 25a is fixed to the table 25b. The table 25b is placed on the table moving mechanism 25c so as to be movable in the XYZθ directions. The table moving mechanism 25c moves the table 25b in the XYZθ directions, and thereby moves the stage 23 in the XYZθ directions through all the struts 25a fixed to the table 25b.

The image capture unit 26 acquires images (images including alignment marks) by performing an image capture operation on the display panel 2 through the lens plate 4 at a visual distance. This image capture unit 26 is provided to an image capture moving mechanism (not illustrated) so as to be movable in the z axis direction in which the image capture unit 26 moves close to and away from the stage 23. A CCD camera, for example, is used as the image capture unit 26. The image capture unit 26 is brought into focus by the image capture moving mechanism moving the image capture unit 26 up and down, an auto-focus function, or the like. The alignment of the display panel 2 and the lens plate 4 is performed based on the alignment marks (marks for alignment) respectively attached to edge portions of the display panel 2 and edge portions of the lens plate 4, or on the alignment marks displayed as images on the display panel 2. An image of these alignment marks is captured by the image capture unit 26.

In the bonding step, as shown in FIG. 5, the stage 23 is moved up by the stage moving mechanism 25, and the display panel 2 on the stage 23 is pressed against the lens plate 4. In this way, the display panel 2 and the lens plate 4 are bonded together in a reduced pressure atmosphere with the bonding pressure Pb. Thus, the enclosed space N formed by the display panel 2, the adhesive member 3 and the lens plate 4 is hermetically sealed to have a pressure lower than the atmospheric pressure.

In the precuring step, as shown in FIG. 5, multiple radiation heads 27 configured to emit light for precuring partially cure the adhesive member 3 located between the display panel 2 and the lens plate 4 in the bonding complete state. Incidentally, a photocurable resin, for example, is used here as the adhesive member 3.

Each of the radiation heads 27 is provided in the second chamber 22b to be arranged on the line of the frame shape while avoiding a window M of the second chamber 22b. The window M of the second chamber 22b is formed in the second chamber 22b by using a transparent material such as a glass, for example, so as to allow the image capture unit 26 to capture images. Each of the radiation heads 27 emits light to the adhesive member 3 located between the display panel 2 and the lens plate 4 in close contact with each other, and thereby partially cures the adhesive member 3 (precuring). During this curing, the light emitted from each of the radiation heads 27 reaches the adhesive member 3 after passing through a through hole in the supporting unit 24.

In the taking-out step, as shown in FIG. 6, the inside of the decompression chamber 22 is opened to the air, the second chamber 22b is moved in the z axis direction by the chamber moving mechanism, and the decompression chamber 22 enters the open state. Thereafter, the display device 1A shown in FIG. 1 is taken out from the stage 23. After that, the display device 1A is conveyed to an apparatus for final curing by an operator or a machine such as a robot, and then the adhesive member 3 is finally and completely cured by the apparatus for final curing.

In the foregoing manufacturing process, the bonding pressure Pb leading to the obtaining of the necessary internal pressure Pa is figured out, and the display panel 2 and the lens plate 4 are bonded together with the adhesive member 3 in the reduced pressure atmosphere with the bonding pressure Pb, as described above. Consequently, the enclosed space N formed by the display panel 2, the adhesive member 3 and the lens plate 4 is in the hermetic sealing state with an internal pressure lower than the atmospheric pressure, the convex portions of the lenticular lens 4a and the display panel 2 (polarizing plate 2c) are in complete contact with each other without having any gap, and thereby the vertical distance L falls within the allowable range. At this time, the internal pressure Pa is at a necessary pressure level, and a pressure difference between the internal pressure Pa and the atmospheric pressure is sufficiently large. Accordingly, the close contact between the convex portions of the lenticular lens 4a and the display panel 2 is maintained even after the manufacturing. Such close contact makes it possible to prevent a change of a gap between the convex portions of the lenticular lens 4a and the display panel 2, which may otherwise occur because of deformation due to their own weights, partial pressurization from outside, ambient temperature rise and the like. As a result, accuracy of a gap between the display panel 2 and the lens plate 4, i.e., gap accuracy between the pixels and the lens can be maintained.

According to the first embodiment of the present invention, as described above, the adhesive member 3 is applied onto the display panel 2 so as to form the continuous frame shape with an application height higher than the final adhesive thickness (the separation distance between the display panel 2 and the lens plate 4 in the bonding complete state) P; the application height of the adhesive member 3 thus applied is measured; the volume Vb of the enclosed space N in the distant state is figured out by using the lowest application height of the adhesive member among the measured application heights; the bonding pressure Pb leading to the obtaining of the necessary internal pressure Pa of the enclosed space N is figured out by use of the figured-out volume Vb of the enclosed space N; and the display panel 2 and the lens plate 4 are bonded together with the aforementioned adhesive member 3 in the reduced pressure atmosphere with the figured-out bonding pressure Pb. Consequently, the display panel 2 and the lens plate 4 are bonded together in the reduced pressure atmosphere with the figured-out bonding pressure Pb.

In this way, the enclosed space N of the display device 1A is in the hermetic sealing state with its internal pressure lower than the atmospheric pressure, and the convex portions of the lenticular lens 4a and the display panel 2 (polarizing plate 2c) are in complete contact with each other. Thus, a gap that is a separation distance therebetween does not exist and the vertical distance L falls within the allowable range. As a result, an error in the viewing angle also surely falls within the allowable range. As described above, while the space between the display panel 2 and the lens plate 4 is surely decompressed, the display panel 2 and the lens plate 4 can be bonded together without having any gap formed therebetween. This prevents an increase in the vertical distance L, that is, an increase in the error in the viewing angle. At this time, the internal pressure Pa is at the necessary pressure level, and the pressure difference between the internal pressure Pa and the atmospheric pressure is sufficiently large. Accordingly, the close contact is maintained even after the manufacturing, and such close contact makes it possible to prevent a change of a gap between the convex portions of the lenticular lens 4a and the display panel 2, which may otherwise occur because of deformation due to their own weights, partial pressurization from outside, ambient temperature rise and the like. As a result, accuracy of a gap between the display panel 2 and the lens plate 4, i.e., gap accuracy between the pixels and the lens can be maintained, and therefore, the display device 1A capable of providing stable three dimensional image quality can be manufactured.

Instead of the foregoing first method, the adhesive member 3 is applied partially by a smaller amount, so that the recessed portion 3a with the lowest application height is formed in a particular portion of the adhesive member 3. Then, the lowest application height of the recessed portion 3a thus formed is measured. Unlike the first method, this second method does not require measurement of the application height for the entire adhesive-applied area of the adhesive member 3. What is to be done for figuring out the volume Vb of the enclosed space N in the distant state is measuring the application height only for the recessed portion 3a that has the lowest application height. Thus, the time needed to measure the application height can be shortened, and thereby a reduction in the overall manufacturing time can also be achieved.

Second Embodiment

A second embodiment according to the present invention will be described with reference to FIGS. 10 and 11.

The second embodiment of the present invention is basically the same as the first embodiment. For this reason, the second embodiment will be described only in points different from the first embodiment. Moreover, the description on part of the second embodiment is omitted if the part is the same as the first embodiment.

In the second embodiment of the present invention, an adhesive member 3 formed in a continuous frame shape having an application height higher than a final adhesive thickness (height) P of a display device 1A is provided with lower portions (recessed portions) each having an application height lower than the final adhesive thickness P. Moreover, the adhesive member 3 is formed so that the lower portions can be filled with the adhesive member 3 with its surface tension and viscosity after the bonding. Here, the width and number of the lower portions (recessed portions) are adjusted suitably according to the size of a display panel 2, a material used as the adhesive member 3, and the like. In addition, unlike the first embodiment, it is not necessary to figure out the bonding pressure Pb, but instead, the bonding is performed in a reduced pressure atmosphere with a predetermined vacuum pressure.

Figure 10:
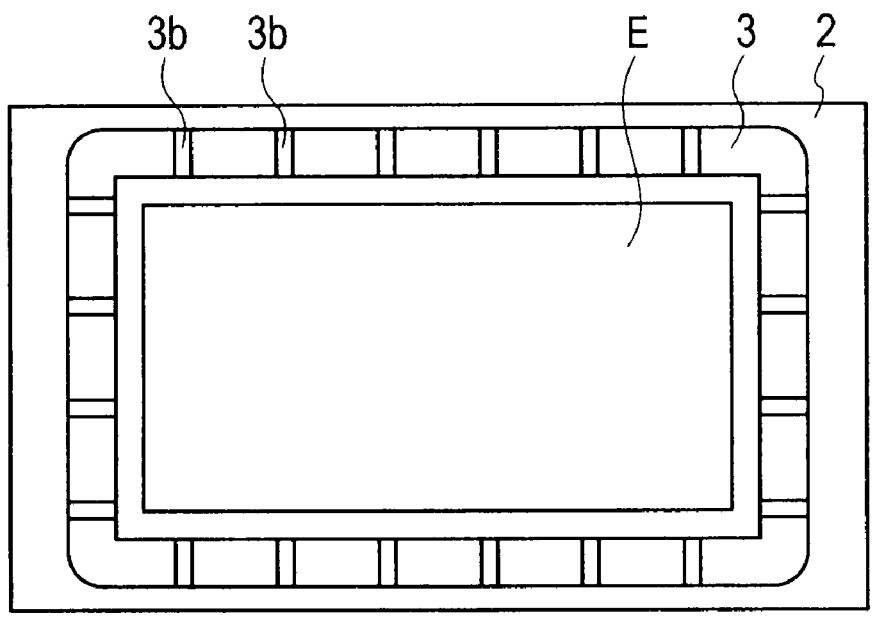
FIG. 10 is a plan view showing a display panel after the application of an adhesive member according to a second embodiment of the present invention
Figure 11:
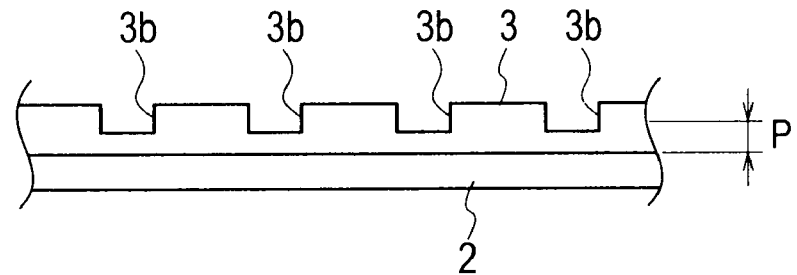
FIG. 11 is a side view showing, in a zoom-in mode, a part of the display panel after the application of the adhesive member shown in FIG. 10.

For example, as shown in FIGS. 10 and 11, the adhesive member 3 is applied in a continuous frame shape surrounding a display region E of the display panel 2. Moreover, the adhesive member 3 is applied to be recessed at multiple locations, that is, is applied in a continuous frame shape having alternate higher and lower application heights than the final adhesive thickness P of the display device 1A. In this way, multiple recessed portions 3b are formed in the adhesive member 3 in the continuous frame shape. These recessed portions 3b are formed by applying a smaller adhesive amount than that applied to the other portions, for example. The application height of the adhesive member 3 other than the recessed portions 3b is higher than the final adhesive thickness P, but the application height of each of the recessed portions 3b of the adhesive member 3 is lower than the final adhesive thickness P. Here, in the bonding step, the adhesive member 3 is squashed, and each of the recessed portions 3b is gradually filled with the adhesive member 3 around the recessed portion 3b. Thereafter, in the bonding complete state, all the recessed portions 3b are completely filled, and thus the enclosed space N is hermetically sealed.

According to the second embodiment of the present invention, as described above, the adhesive member 3 is applied onto the display panel 2 so as to form the continuous frame shape having the application height higher than the final adhesive thickness P of the display device 1A, and to include the recessed portions 3b each having the application height lower than the final adhesive thickness P. Then, the display panel 2 and the lens plate 4 are bonded together with the applied adhesive member 3 in the reduced pressure atmosphere. Since the recessed portions 3b make the volume Vb of the enclosed space N in the distant state closer to the volume Va of the enclosed space N in the bonding complete state, the internal pressure Pa becomes approximately equal to the bonding pressure Pb (Pa=Pb×Vb/Va). As a result, the pressure difference between the internal pressure Pa and the atmospheric pressure is sufficiently large, and the same effect as the first embodiment can be produced. Moreover, unlike the first embodiment, the second embodiment does not have to include the step of measuring the application height of the adhesive member 3, nor the step of figuring out the bonding pressure Pb, for example. Consequently, the manufacturing process can be simplified by including only a decreased number of steps.

Third Embodiment

A third embodiment according to the present invention will be described with reference to FIGS. 12 to 15.

The third embodiment of the present invention is basically the same as the first embodiment. For this reason, the third embodiment will be described only in points different from the first embodiment. Moreover, the description on part of the third embodiment is omitted if the part is the same as the first embodiment.

In the third embodiment of the present invention, an adhesive member 3 is applied to a display panel 2 to form a discontinuous frame having an application height higher than a final adhesive thickness (height) P of a display device 1A, and is formed so that such discontinuous portions can be filled with the adhesive member 3 with its surface tension and viscosity after the bonding. Here, the width and number of the discontinuous portions are adjusted suitably according to the size of the display panel 2, a material used as the adhesive member 3, and the like. In addition, unlike the first embodiment, it is not necessary to figure out the bonding pressure Pb, but instead, the bonding is performed in a reduced pressure atmosphere with a predetermined vacuum pressure.

Figure 12:
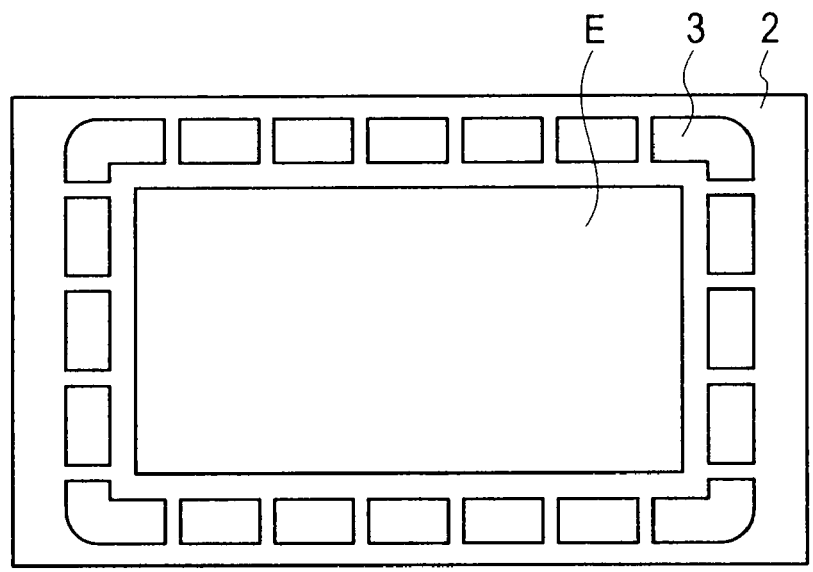
FIG. 12 is a plan view showing a display panel after the application of an adhesive member according to a third embodiment of the present invention
Figure 13:
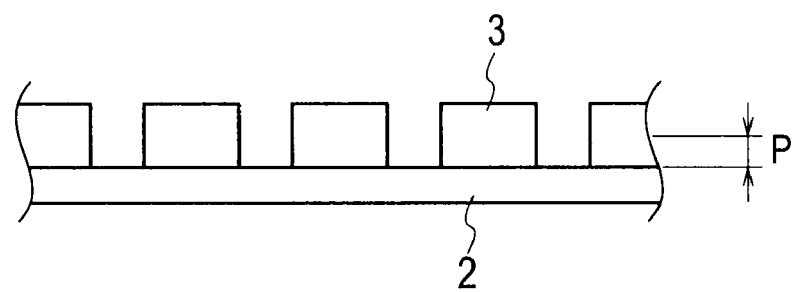
FIG. 13 is a side view showing, in a zoom-in mode, a part of the display panel after the application of the adhesive member shown in FIG. 12.

For example, as shown in FIGS. 12 and 13, the adhesive member 3 is applied in a frame shape surrounding a display region E of the display panel 2 and including discontinuous portions repeatedly appeared. Thereby, multiple portions having no adhesive member 3 are formed in the adhesive member 3 in the frame shape. These portions are formed by repeated and intermittent adhesive application, for example. The application height of the adhesive member 3 is higher than the final adhesive thickness P of the display device 1A. Here, in the bonding step, the adhesive member 3 is squashed, and each of the discontinuous portions is gradually filled with the adhesive member 3 around the discontinuous portion. Thereafter, in the bonding complete state, all the discontinuous portions are completely filled, and thus the enclosed space N is hermetically sealed.

According to the third embodiment of the present invention, as described above, the adhesive member 3 is applied onto the display panel 2 so as to form the discontinuous frame shape having the application height higher than the final adhesive thickness P of the display device 1A, and then the display panel 2 and the lens plate 4 are bonded together with the applied adhesive member 3 in the reduced pressure atmosphere. Thereby, the volume Vb of the enclosed space N in the distant state is made almost equal to the volume Va of the enclosed space N in the bonding complete state, and thus the internal pressure Pa becomes approximately equal to the bonding pressure Pb (Pa=Pb×Vb/Va). As a result, the pressure difference between the internal pressure Pa and the atmospheric pressure is sufficiently large, and the same effect as the first embodiment can be produced. Moreover, unlike the first embodiment, the second embodiment does not have to include the step of measuring the application height of the adhesive member 3, nor the step of figuring out the bonding pressure Pb, for example. Consequently, the manufacturing process can be simplified by including only a decreased number of steps.

Note that, in the case of using the aforementioned adhesive member 3 in the discontinuous frame shape, the discontinuous portions need to be completely filled to hermetically seal the enclosed space N surely, and to maintain the airtightness of the enclosed space N.

Figure 14:
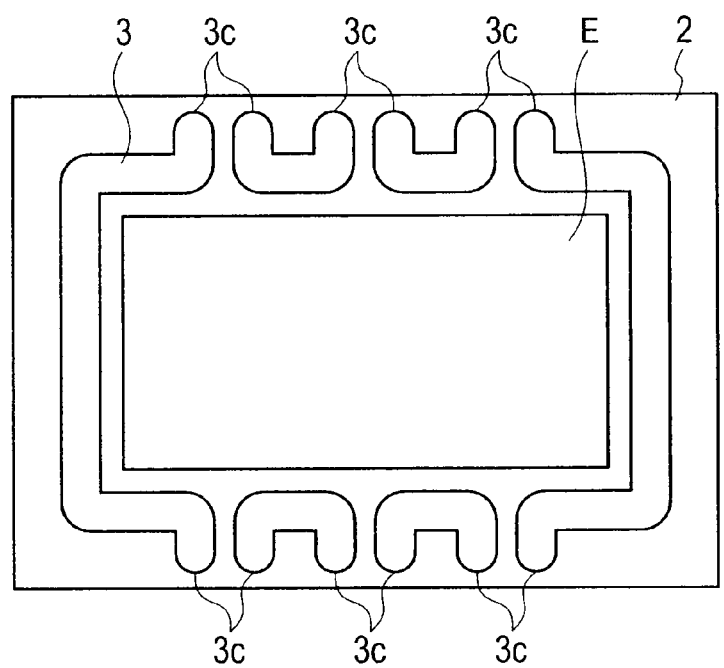
FIG. 14 is a plan view showing an application modification example of a display panel after the application of an adhesive member shown in FIG. 12.

To this end, as shown in FIG. 14, the adhesive member 3 is applied in the application step so as not only to include the discontinuous portions repeatedly as described above, but also to extend toward an outer periphery of the display panel 2 at both ends of each of the discontinuous portions so that adjacent pieces of the adhesive member 3 across the discontinuous portion can be kept apart from each other. Thereby, a distance in which the adjacent pieces of the adhesive member 3 across each of the discontinuous portions face each other is made longer, and accordingly each of the discontinuous portions of the adhesive member 3 is more easily filled with the adhesive member 3 around the discontinuous portion. Thus, all the discontinuous portions of the adhesive member 3 can be completely filled and thereby the enclosed space N can be hermetically sealed surely. Incidentally, in FIG. 14, the adhesive member 3 is bent at an approximately right angle from the discontinuous portion toward the outer periphery of the display panel 2, and the separation distance between the adjacent pieces of the adhesive member 3 is maintained constant.

Figure 15:
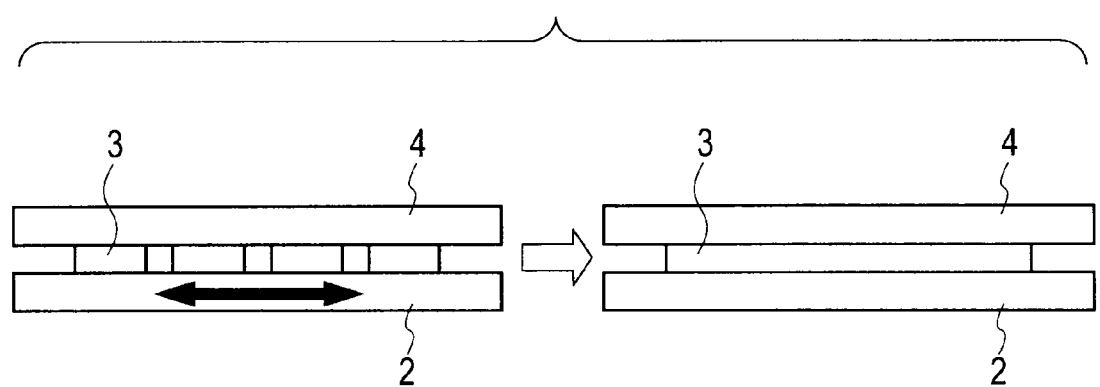
FIG. 15 is an explanatory view for explaining a swinging step performed when the display panel after the application of the adhesive member shown in FIG. 12 and a lens plate are bonded together.

Instead, as shown in FIG. 15, a stage 23 on which the display panel 2 is placed may be swung in the bonding step (see the left side of FIG. 15). This causes each of the discontinuous portions of the adhesive member 3 to be surely filled with the adhesive member 3 therearound (see the right side of FIG. 15). Thus, by swinging the display panel 2, all the discontinuous portions of the adhesive member 3 can be completely filled and thereby the enclosed space N can be hermetically sealed surely. Incidentally, although only the display panel 2 is swung here, this is not the only way to do. That is to say, any one of or both of the display panel 2 and the lens plate 4 may be swung.

Other Embodiments

It should be noted that the present invention is not limited to the foregoing embodiments, and can be modified without departing from the spirit of the present invention.

For example, the adhesive member 3 is applied to the display panel 2 in the foregoing embodiments, but the present invention is not limited to this. The adhesive member 3 may be applied to the lens plate 4, instead of the display panel 2.

In addition, the liquid crystal display panel (LCD) is used as the display panel 2 in the foregoing embodiments, but the present invention is not limited to this. Any of a plasma display panel (PDP), a field emission display panel (FED), a surface-conduction electron-emitter display panel (SED), and the like may be used. If the display panel 2 is capable of displaying an image by emitting light by itself, the display panel 2 may be connected to a controller and be caused to display an image for alignment as needed. In this case, the illumination unit does not have to be used.

Lastly, although various numeral values have been cited in the foregoing embodiments, these numeral values are described just as examples and not intended to limit the present invention.

What is claimed is:

1. A method of manufacturing a three dimensional image display device, comprising:
   applying an adhesive member to any one of a lens plate including a lenticular lens, and a display panel configured to display an image, the adhesive member applied to form a continuous frame having an application height higher than a separation distance between the lens plate and the display panel in a bonding complete state;
   measuring the application height of the adhesive member thus applied;
   figuring out a volume of an enclosed space, which is formed by the display panel, the adhesive member and the lens plate, by using a lowest application height of the adhesive member thus measured, and figuring out a bonding pressure leading to obtaining of a necessary internal pressure in the enclosed space, by using the volume of the enclosed space thus figured out; and
   bonding the lens plate and the display panel together by use of the adhesive member, with the display panel and the lenticular lens facing each other, in a reduced pressure atmosphere with the figured-out bonding pressure.

2. The method of manufacturing a three dimensional image display device according to claim 1,
   wherein a recessed portion having a lowest application height is formed in a particular part of the adhesive member by applying a smaller amount of the adhesive member to the particular part than that applied to the other part in the adhesive member, and
   the lowest application height of the recessed portion is measured.

* * * * *